Patented July 29, 1924.

1,503,202

UNITED STATES PATENT OFFICE.

TREADWAY B. MUNROE, OF NEW ORLEANS, LOUISIANA, ASSIGNOR TO C. F. DAHLBERG, OF MINNEAPOLIS, MINNESOTA.

METHOD OF PREVENTING THE NATURAL DETERIORATION OF BAGASSE FIBERS.

No Drawing. Application filed August 12, 1921. Serial No. 491,749.

*To all whom it may concern:*

Be it known that I, TREADWAY B. MUNROE, a citizen of the United States, residing at New Orleans, in the parish of Orleans and State of Louisiana, have invented certain new and useful Improvements in Methods of Preventing the Natural Deterioration of Bagasse Fibers; and I do hereby declare the following to be a full, clear, and exact description of the invention, such as will enable others skilled in the art to which it appertains to make and use the same.

This invention relates to a method of preserving bagasse fibers for pulp making purposes, after they have been delivered from the sugar mill. The object of the invention is to provide a method which will be comparatively simple and easy to carry out and more certain in use than those heretofore proposed.

With these and other objects in view, the invention consists in the novel steps and combinations of steps constituting the process, all as will be more fully hereinafter disclosed and particularly pointed out in the claims.

In order that the invention may be the more clearly understood, it is said: If a mass of bagasse after leaving the mill is exposed to the weather in a hot climate as is usually done, owing to its content of moisture, sugar, and gummy matters, there will first set in an alcoholic fermentation, which is followed by an acetic acid fermentation, and these two fermentations if not checked will consume substantially all the sugar and gummy matters present. If now the mass is still permitted to lie out in the weather, what I call a humic acid fermentation will set in, which will destroy the strength of the fibers, and render them unfit for pulp making purposes. In addition to this, if the bagasse is baled, the acetic acid formed will act on any iron present, such as the bands surrounding the bagasse mass, to form ferrous acetate, thus destroying said bands, which will let the interior of the mass be further exposed to the air, and will thus aggravate the deteriorating reactions. Further, the ferrous acetate with the advent of more air forms ferric oxide, which becomes hydrated and reacts with the tannic acid present to form a black ferric tannate which so discolors the fibers as to produce lower grades of pulp.

I obviate the foregoing objections, in carrying out this invention, by proceeding as follows: I add to the interior of the mass of bagasse at any time prior to the completion of the acetic acid fermentation any suitable insoluble compound having an alkaline reaction, such as lime, crushed limestone, crushed oyster shells, etc., either dry or mixed with water. I then subject the lime containing mass preferably in a baling press, to a pressure sufficient to form over a portion or all of its surface, compacted, substantially air impervious layers of fibers cemented together by the said sugar and gummy matters present in the bagasse.

The addition of the alkaline substance tends to prevent acid fermentations from progressing further, and also tends to neutralize any acid that may be already formed. The exclusion of air by means of said air impervious layers also tends to prevent fermentation, and therefore the formation of acetic and humic acids as well as of ferric tannates. Thus I am enabled to prevent to a degree the destruction of the strength of the fibers, as well as a decolorization thereof.

After the mass has been subjected to pressure, it is preferably bound as by iron wire, and kept bound until it is to be used in the manufacture of pulp.

What I claim is:

1. The process of preventing the natural deterioration for pulp making purposes, of a mass of bagasse fibers containing sugar and gummy substances, which consists in adding to the interior of said mass a relatively insoluble compound adapted to retard the progress of acid fermentations; and forming on the exterior of said mass a substantially air impervious layer of fibers, substantially as described.

2. The process of preventing the natural deterioration for pulp making purposes, of a mass of bagasse, which consists in adding to said mass a relatively insoluble compound adapted to inhibit an acetic acid fermentation and containing combined calcium carbon and oxygen; and preventing the free access of air to said mass, substantially as described.

3. The process of preventing the natural deterioration, for pulp making purposes, of a mass of bagasse, which consists in adding to the interior of said mass, a compound having an alkaline reaction and containing calcium carbonate; and subjecting said mass to a pressure sufficient to form a substantially air impervious layer on its outer surface, substantially as described.

4. The process of preventing the natural deterioration for pulp making purposes of a mass of bagasse containing sugar and gummy matters which consists in adding to the interior thereof after an acetic acid fermentation has set in, a compound containing a salt of calcium which is easily decomposed by acetic acid; and forming the same into a bale under pressure to produce a substantially air impervious layer on its outer surface, substantially as described.

5. A compacted mass of bagasse fibers suitable for pulp making purposes having a substantially air impervious layer on its outside and a fermentation retarding compound on its interior, substantially as described.

6. A compacted mass of bagasse fibers suitable for pulp making purposes having a substantially air impervious layer on its outside and a fermentation retarding compound containing a salt of calcium easily decomposed by acetic acid on its interior, substantially as described.

In testimony whereof I affix my signature.

TREADWAY B. MUNROE.